June 23, 1964

T. B. HARPER 3,138,395

KNOTTER MECHANISM

Filed Jan. 24, 1963

INVENTOR.
TOBY B. HARPER

BY Head & Johnson

ATTORNEYS

INVENTOR.
TOBY B. HARPER
ATTORNEYS

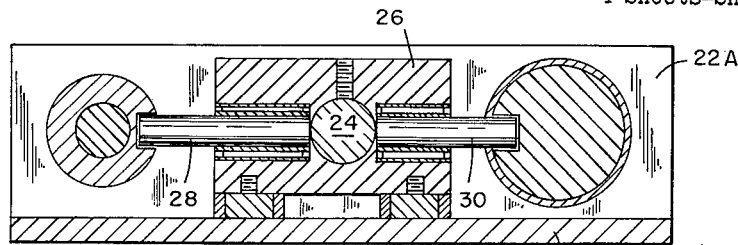
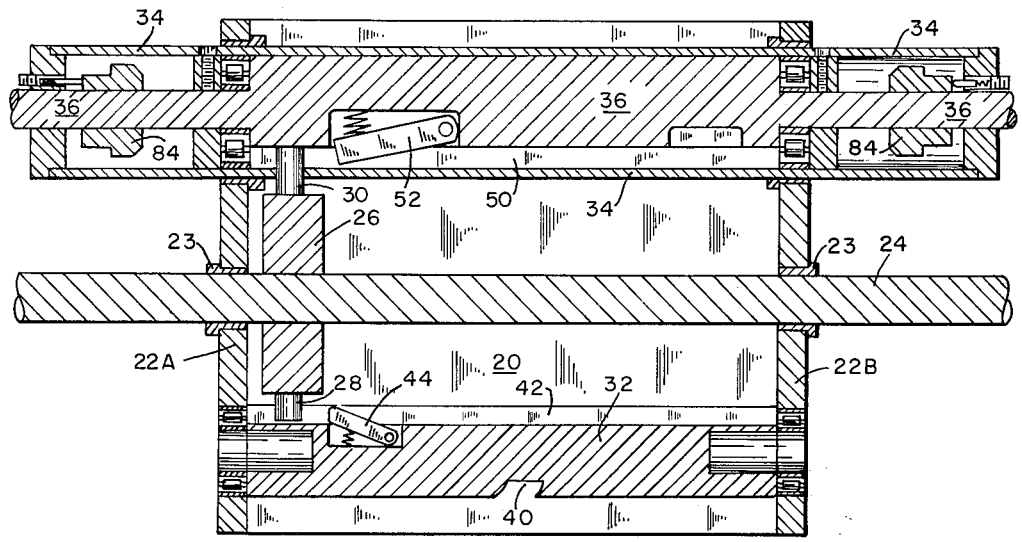
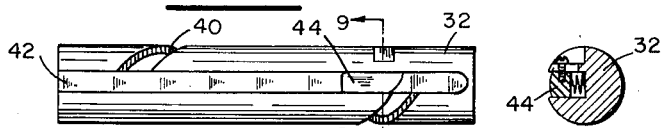
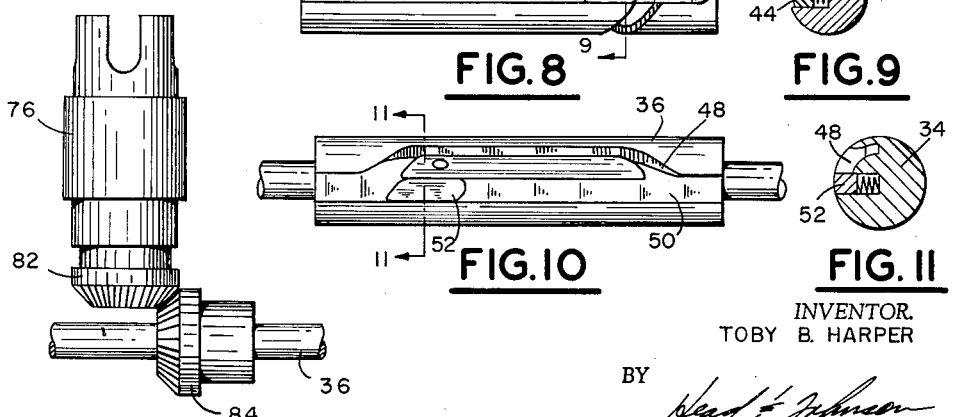

June 23, 1964   T. B. HARPER   3,138,395
KNOTTER MECHANISM

Filed Jan. 24, 1963   4 Sheets-Sheet 4

INVENTOR.
TOBY B. HARPER

BY
*Head & Johnson*
ATTORNEYS

United States Patent Office 3,138,395
Patented June 23, 1964

3,138,395
KNOTTER MECHANISM
Toby B. Harper, Dolph, Ark.
Filed Jan. 24, 1963, Ser. No. 253,662
12 Claims. (Cl. 289—9)

This invention relates to a knotter mechanism. More particularly, this invention relates to a knotter mechanism for tying hay bale twine. Still more particularly, this invention relates to a knotter mechanism providing means for tying two twines around a bale of hay utilizing a single mechanism.

The most common means of baling hay is to compress the hay into square blocks and to retain the blocks in their pressed shape by wrapping the blocks in two twines and tying the twines. Such twine tying hay balers are in common use in the agriculture industry.

Currently used types of knotter mechanisms for tying twine on hay balers utilize two separate knotter mechanisms, each more or less independently operating to each individually tie the twine to bind the bale of hay. When two separate knotter mechanisms are utilized the number of components is increased many fold and the expense of manufacture, assembly and maintenance of the knotter mechanism is substantially increased.

It is therefore an object of this invention to provide a knotter mechanism for tying two twines utilized to bind hay in a hay baler in a means wherein a single mechanism ties both twines.

Another object of this invention is to provide a knotter mechanism for use with a hay baler having an improved twine holder which functions to hold the twine while it is being tied but in such a way that the twine is under no tension during the formation of the knot.

Another object of this invention is to provide a knotter mechanism having an improved knife means for cutting the twine at the end of the tying cycle.

Another object of this invention is to provide a knotter mechanism which is small and compact compared to present knotter mechanisms, which is inexpensive to manufacture and produce, which has a fewer number of moving parts than present knotter mechanisms, and which is simpler, easy to repair, and more fail-proof than other types of knotter mechanisms.

These and other objects and a better understanding of the invention may be had by referring to the following description and claims taken in conjunction with the attached drawings in which:

FIGURE 5 is a cross-sectional view taken along the line 5—5 of FIGURE 1.

FIGURE 6 is a cross-sectional view taken along the line 6—6 of FIGURE 2.

FIGURE 7 is a view showing the gearing arrangement utilized to rotate the twine holder element of the invention.

FIGURE 8 is a plan view of the bill hook rotating member of the invention.

FIGURE 9 is a cross-sectional view taken along the line 9—9 of FIGURE 8 showing the guide trip element of the bill hook rotating member of the invention.

FIGURE 10 is a plan view of the twine holder control member of the mechanism of this invention.

FIGURE 11 is a cross-sectional view taken along the line 11—11 of FIGURE 10 showing in cross-section the guide trip mechanism utilized to control the cam action of the twine holder control mechanism.

Figure 1:
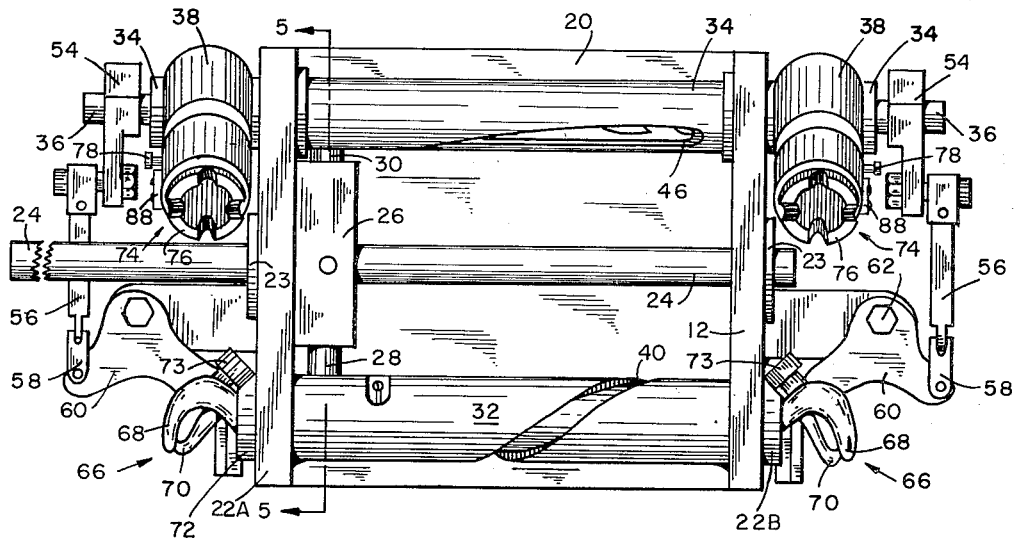
FIGURE 1 is a top view of the knotter mechanism of this invention.
Figure 2:
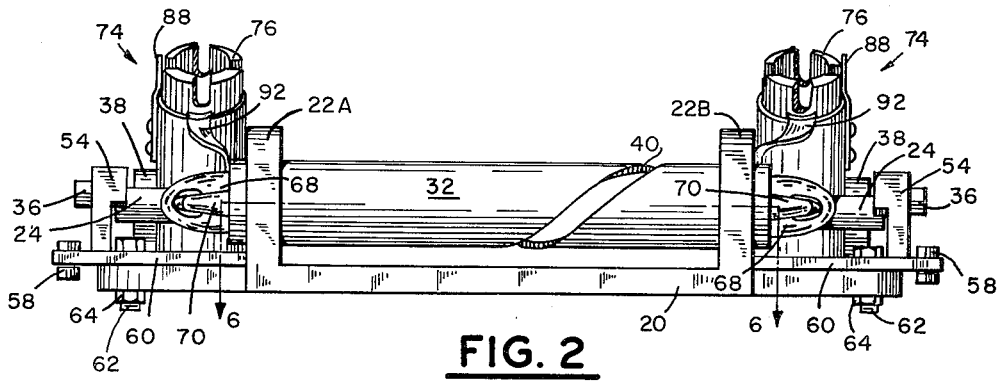
FIGURE 2 is a front view of the knotter mechanism of this invention.

Referring to the drawings and first to FIGURES 1 and 2, the complete assembled knotter mechanism is shown. A base 20 is provided which supports the other components of the invention and by which the mechanism may be supported on a hay baler. Extending uprightly and spaced from each other is a first support member 22A and a second support member 22B. A cover (not shown) may be provided enclosing all of the components of the mechanism from the upright support 22A to support 22B, or preferably, base 20 may be extended upwardly at each side to form an opened top enclosure with the support members 22A and 22B forming the ends thereof so that the enclosure may be utilized for retaining a lubricant permitting the major components of the invention to at all times run in oil. For purposes of simplifying the invention such an enclosure is not shown, although it is understood that such an arrangement is within the purview of the invention.

Still referring to FIGURES 1 and 2, base 20 with support members 22 slidably receive, through bushings 23 located in the support members 22, a horizontal reciprocating shaft 24. Attached to the reciprocating shaft 24 is an actuating peg 26 which has two pegs 28 and 30 extending therefrom equally spaced and perpendicular to the reciprocating shaft 24 and horizontal to the base 20. Rotatably mounted in the support members 22 parallel to the reciprocating shaft 24 is a bill hook shaft 32. Equally spaced opposite the bill hook shaft 32 and rotatably mounted in the support members 22 and parallel to the reciprocating shaft 24 is a twine holder shaft 34. Both bill hook shaft 32 and twine holder shaft 34 are grooved to receive the pegs 28 and 30. The twine holder shaft 34 is rotatably and axially penetrated by an inner shaft 36 that is also grooved to receive peg 30. Affixed on each end of the twine holder shaft 34 is a twine take-up housing 38 which is also axially and rotatably penetrated by the inner shaft 36. By the reciprocating motion of the reciprocating shaft 24 the actuating peg 26 travels with the pegs 28 and 30 horizontally in the grooves, thus rotating the bill hook shaft 32, twine holder shaft 34, and the inner shaft 36.

Referring to FIGURES 6, 8 and 9 the rotational groove means on the bill hook shaft 32 can best be seen. The turning groove 40 on the bill hook shaft 32 is so designed that at the end of the tying cycle the bill hook shaft 32 has rotated 360 degrees. In other words, when the actuating peg 26 has traveled the length of the bill hook shaft 32, the bill hook shaft 32 has thus rotated 360 degrees. Also located on the bill hook shaft 32 is the return groove 42 which allows the actuating peg 26 to return to its original position without rotating the bill hook shaft 32. This return groove 42 is a straight groove that is parallel to the travel of the actuating peg 26. At the end of the return cycle the peg 28 trips a resilient catch 44. This resilient catch 44 prevents the actuating peg 26 from traveling down the return groove 42 upon the start of the next cycle.

Figure 4:
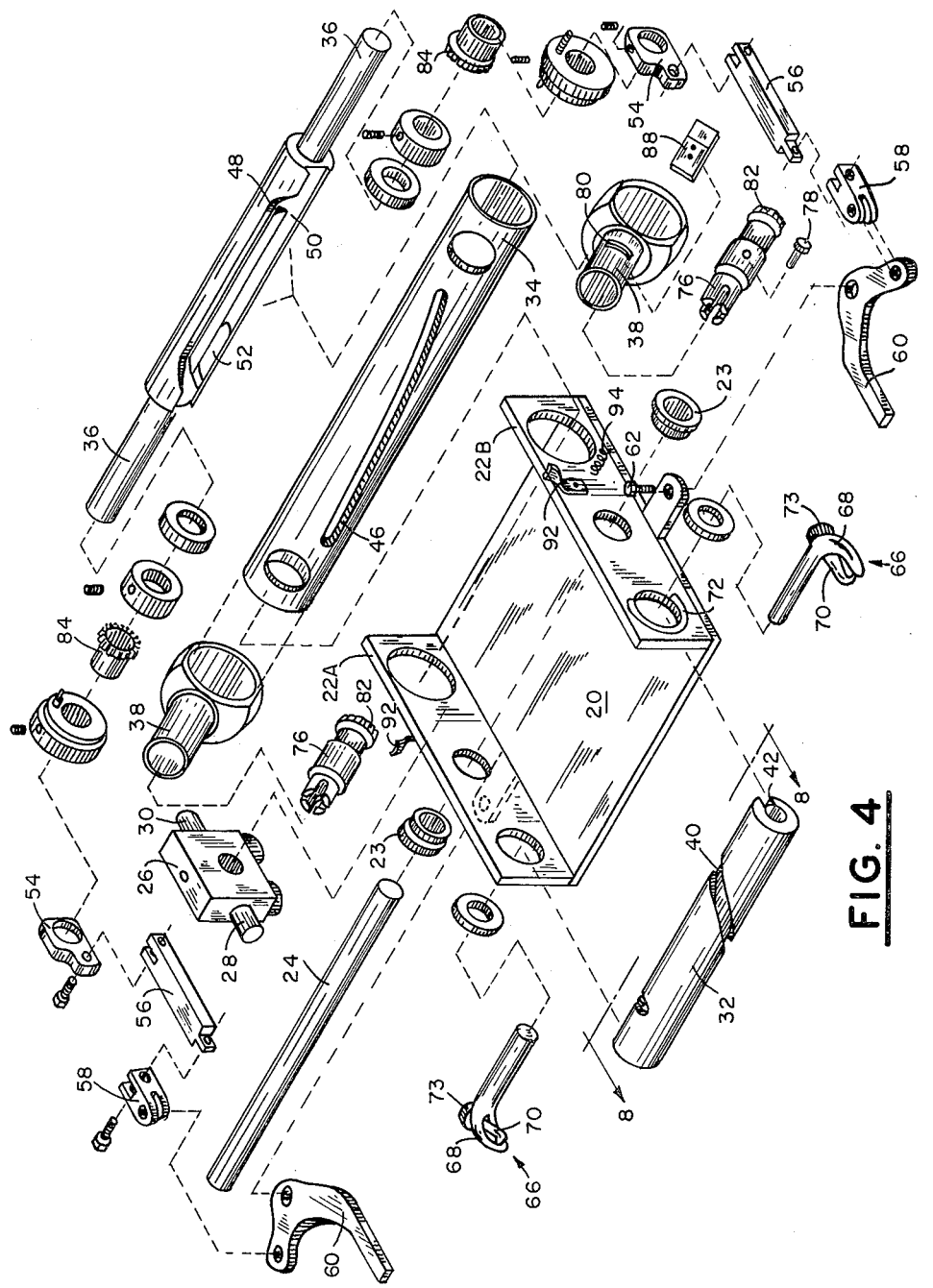
FIGURE 4 is an isometric exploded view of the components making up the knotter mechanism of this invention.

Referring to FIGURES 4, 6, 10 and 11 and more specifically to FIGURE 4, the groove means for the twine holder shaft 34 and the inner shaft 36 can be seen. A twine take-up groove 46 has a gradual slope that rotates the twine holder shaft 34 approximately 60 degrees by the actuating peg 26 and peg 30 traveling in the take-up groove for the full length. The actuating peg 26 and peg 30 on the return cycle return the twine holder shaft 34 back to its original position.

The inner shaft 36, referring to FIGURES 10 and 11, is also rotated by the actuating peg 26 and peg 30 being received in the inner groove 48 and rotates separately inside and axially with the twine holder shaft 34. Upon the initial movement of the actuating peg 26 the inner groove 48 is so aligned that the peg 30 rotates the inner shaft 36 approximately 90 degrees. From this point the travel of the peg 30 and the inner groove 48 is a straight horizontal line, thus the inner shaft 36 does not rotate but is held in the 90 degree position. As the actuating peg 26 and peg 30 near the end of the forward cycle the inner groove 48 with the peg 30 received returns the inner shaft 36 back the 90 degrees that it had previously turned. On the return cycle the peg 30 follows in a return groove 50 back to its original position. At the end of the return groove 50 is a resilient catch 52 which prevents the peg 30 from traveling down the return groove 50 on the forward cycle, thus forcing the peg 30 to travel in the inner groove 48 as previously described.

Secured one to each end of the inner shaft 36 is a turning arm 54 with a portion of that arm extending downward, and pivotally attached on this portion is a universal shaft 56. Attached to the opposite end of this universal shaft 56 is a pivotally mounted universal coupling 58 which couples the universal shaft 56 to a twine finger arm 60. The twine finger arm 60 is pivotally mounted to the base 20 by means of a nut 62 and bolt 64. The pivotation of the turning arm 54 moves the twine finger arm 60 by means of the coupling described.

Bill Hook Assembly

Figure 3:
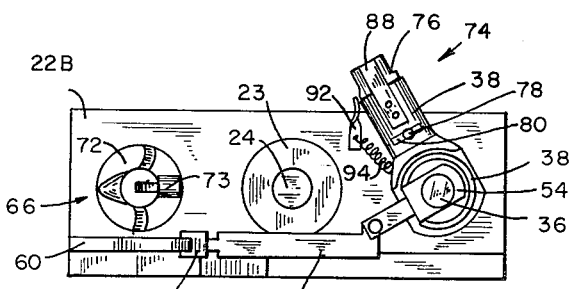
FIGURE 3 is an end view of the knotter mechanism of this invention.

Referring to FIGURE 3 and FIGURE 4, the bill hook assembly 66 denotes the unit that ties the knot. The bill hook assembly 66 is rotatably mounted and secured to the bill hook shaft 32. It is composed of a fixed upper-jaw 68 and a resilient lower jaw 70 having a roller 73 attached that is actuated to open and close by a fixed cam surface 72 mounted on the support member 22 that intermittently comes into contact with the roller 73.

Twine Holder Assembly

The twine holder assembly 74, best seen in FIGURES 1, 2 and 3, is the means for holding the twine while a knot is being tied by the bill hook assembly 66.

The twine holder 76 is rotatably mounted in the twine take-up housing 38 and held in place by means of a pin 78 that is received in a semi-circular groove 80 seen in FIGURE 4 that allows the twine holder to rotate 90 degrees. On the top end of the cylindrical twine holder 76 are four longitudinal slots extending downward and equally spaced. On the lower end of the twine holder 76, FIGURE 7, is fastened a gear 82 that meshes with a power gear 84 which is located and attached axially to the inner-shaft 36. When the inner-shaft 36 rotates 90 degrees the twine holder 76 is rotated by the power gear 84 driving the gear 82. On the back cycle the inner-shaft 36 rotates 90 degrees in the opposite direction returning the twine holder 76 to its original position. Mounted securely on the side of the take-up housing 38 is a semi-circular plate 88 that extends upward along the side of the cylindrical twine holder 76.

Operation

Figure 12:
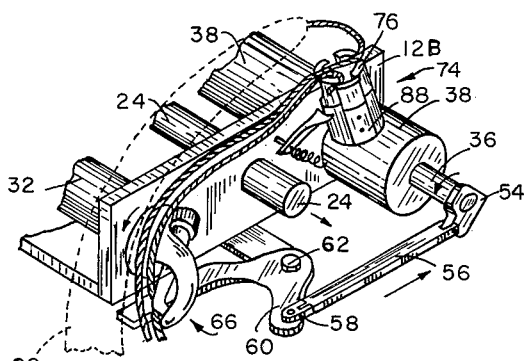
FIGURES 12 through 16 show in isometric one end of the knotter mechanism of this invention as the components move through various stages in the formation of a knot.
Figure 13:
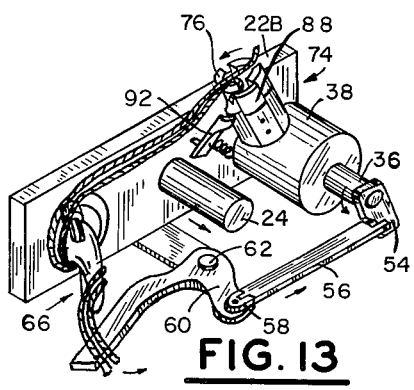

The baler needle arm 90 shown by dotted lines in FIGURE 12 penetrates the compressed bale and proceeds upward until the needle arm 90 is positioned over the twine holder assembly 74. The twine from the baler needle arm 90 is placed across the bill hook assembly 66 and then is received by the slots on the twine holder 76. At this time the reciprocating shaft 24 starts its forward cycle, thus pushing forward the actuating peg 26 with pegs 28 and 30 attached thereto and received in the grooves on the bill hook shaft 32, the twine holder shaft 34 and the inner-shaft 36. The forward motion starts the shafts to rotate. The inner groove on the inner-shaft 36 rotates the inner-shaft 36 and causes these two things to happen: (1) As the shaft 36 turns it also turns a power gear 84 that is attached thereto. Meshing with the power gear 84 is a gear 82 that is attached to the twine holder gear 84 is a gear 82 that is attached to the twine holder 76 and as the twine holder 76 turns it forces the twine in the slots to rotate, thus creating a binding effect on the twine between the twine holder 76 and the semi-circular plate 88 as seen in FIGURE 13. (2) The rotation of the inner-shaft 36 actuates the twine finger arm 60 by the connecting means and pivots it out away from the bill hook assembly 66, thus forcing the twine across and out from the bill hook assembly 66 seen in FIGURE 13. The twine finger arm 60 and the twine holder 76 stay in their respective positions during the tying process, except for the pivotation of the twine holder assembly 74 rotating downward to allow twine slack to tie the knot.

Referring to FIGURE 13, the bill hook assembly 66 starts its rotation with the lower jaw 70 closed. The twine comes from a twine holder 76 across the upper jaw 68 underneath the lower jaw 70 then out across the twine finger arm 60.

Figure 14:
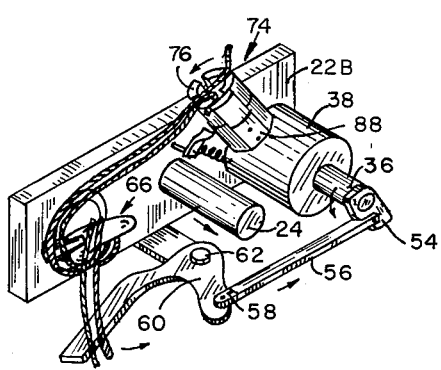

FIGURE 14 shows the position of the bill hook and twine holder 76 after the reciprocating shaft 24 has traveled one-quarter of the distance forward. The twine holder assembly 74 has pivoted forward and the bill hook assembly 66 has rotated 90 degrees with the twine wrapped around the upper and lower jaws 68 and 70.

Figure 15:
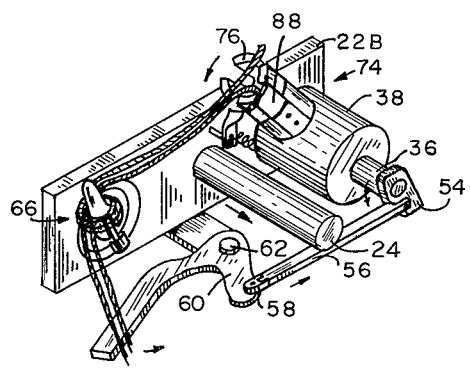

FIGURE 15 shows the halfway position of the forward cycle. The lower jaw 70 of the bill hook assembly 66 is opened by the roller 73 coming into contact with the raised cam surface 72 and the twine from the twine holder 76 passes between the lower jaw 70 and the upper jaw 68.

Figure 16:
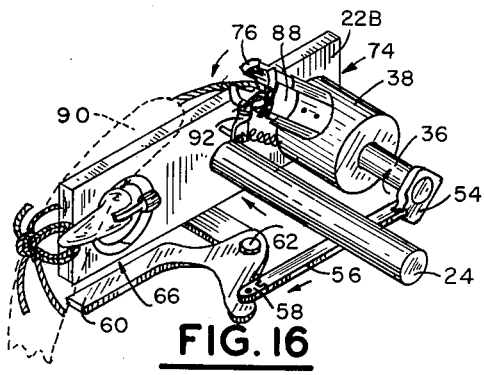
Figure 17:
FIGURE 17 shows the type of knot tied in a twine by the mechanism of this invention.

FIGURE 16 shows the position at the end of the forward cycle with the bill hook assembly 66 rotated 360 degrees and the twine holder assembly 74 at the end of its rotational arc. As the bill hook assembly 66 nears this position the lower jaw 70 closes by its resilient means, grasping the twine strands between its upper and lower jaws 68 and 70. When the twine holder assembly 74 rotates to the last position on its arc the twine strands between the twine holder 76 and the bill hook assembly 66 are cut by the cutter blade 92. The knot pulled by the bill hook assembly 66 is now free and is pulled from the bill hook assembly 66 by the tension of the bale as the bale is extracted from the baler machine.

Before the end of the forward cycle of the reciprocating shaft 24, the baler needle arm 90 returns downward through the hay bale. On the downward arc the needle arm 90 lays the twine in the longitudinal slots of the twine holder 76. At this time the twine holder 76 rotates 90 degrees and binds the twine until the next tying process.

Although this invention has been described in a degree of particularity, it is manifested that many modifications in the details of construction of components may be made without departing from the spirit and scope of this invention.

What is claimed:

1. A twine knotter for hay balers comprising, in combination;
   a freely mounted reciprocating drive shaft driven by outside means;
   a bill hook shaft rotatably mounted parallel to and spaced apart from said reciprocating drive shaft, said bill hook shaft having a groove on the exterior longitudinal surface thereof;
   a first bill hook member affixed to one end of said bill hook shaft and a second bill hook member affixed to the opposite end of said bill hook shaft;
   a twine holder shaft rotatably mounted parallel to and spaced apart from said reciprocating drive shaft, said twine holder shaft having a groove on the exterior longitudinal surface thereof;

a first and second pivotally mounted twine holder means spaced apart from each other, each of said twine holder means mounted adjacent to said bill hook members;

means coupling said twine holders to said twine holder shaft, whereby the twine holders are actuated to grasp said twine on rotation of said twine holder shaft;

a peg affixed and extending from said reciprocating drive shaft, said peg extending into said groove in said bill hook shaft whereby the longitudinal movement of said drive shaft moves said peg in said groove to rotate said bill hook shaft, and a peg affixed to and extending from said reciprocating drive shaft extending into said groove in said twine holder shaft whereby the longitudinal movement of said drive shaft moves said peg in said groove to rotate said twine holder shaft.

2. A twine holder for hay balers according to claim 1 including a rotatably mounted oscillating drive shaft driven by outside means.

3. A twine holder for hay balers according to claim 1 including a rotatably mounted drive shaft driven by outside means.

4. A twine knotter for hay balers according to claim 1 including a twine take-up shaft mounted parallel to and spaced apart from said reciprocating drive shaft and said bill hook shaft, said twine take-up shaft having a groove on the exterior longitudinal surface thereof;

a peg affixed to and extending from said reciprocating drive shaft, said peg extending into said groove in said twine take-up shaft whereby the longitudinal movement of said drive shaft moves said peg in said groove to rotate said twine take-up shaft; and a means coupling said twine holder members to said twine take-up shaft whereby said twine holder members are pivoted by the rotation of said twine take-up shaft.

5. A twine knotter for hay balers according to claim 1 wherein said twine holders each include a first twine holder housing pivotally mounted to one end of said twine holder shaft and a second twine holder housing pivotally mounted to the opposite end of said twine holder shaft;

a rotatably mounted cylindrical twine holder received in each of said twine holder housings, four longitudinal slots on each of said twine holders to receive the said twine;

a semi-circular plate rigidly affixed to said twine holder housing with said plate extending upwardly along side said twine holder;

a gear means attached to said twine holder; and a gear means attached to said twine holder shaft that meshes with said twine holder gear for rotation of said twine holder.

6. A twine knotter for hay balers according to claim 1 including a twine finger shaft rotatably mounted parallel to said reciprocating drive shaft, said twine finger shaft having a groove on the exterior longitudinal surface thereof;

a peg affixed to and extending from said reciprocating drive shaft, said peg extending into said groove in said twine finger shaft wherein the longitudinal movement of said drive shaft moves said peg in said groove to rotate said twine finger shaft; and a first and a second twine finger pivotally mounted beneath said bill hooks with said first twine finger attached to one end of said twine finger shaft and said second twine finger attached to the opposite end of said twine finger shaft.

7. A twine knotter for hay balers comprising, in combination;

a base;

upright frame panels supported by said base;

a reciprocating drive shaft driven by outside means journalled into and freely mounted and supported by said frame panels horizontal to said base;

a bill hook shaft rotatably mounted in said frame panel and parallel to said drive shaft, said bill hook shaft having a groove on the exterior longitudinal surface thereof;

a first and a second bill hook member attached one to each end of said bill hook shaft and next to said frame panels;

a twine holder shaft rotatably mounted into said frame panels and parallel to said drive shaft and said bill hook shaft, said twine holder shaft having a groove in the exterior longitudinal surface thereof;

a first and a second twine holder member pivotally mounted on said frame panels each adjacently positioned to said bill hook members;

a twine take-up shaft rotatably mounted into said frame panels and parallel to said reciprocating drive shaft, said twine take-up shaft having a groove on the exterior longitudinal surface thereof;

means coupling said twine holder members to said twine take-up shaft whereby said twine holder members are pivoted by the rotation of said twine take-up shaft; and a peg means affixed to and extending from said reciprocating drive shaft between said upright frame panels, said peg extending into said groove in said bill hook shaft whereby the longitudinal movement of said drive shaft moves said peg in said groove to rotate said bill hook shaft, a peg affixed to and extending from said reciprocating drive shaft extending into said groove in said twine holder shaft whereby the longitudinal movement of said drive shaft moves said peg in said groove to rotate said twin holder shaft, and a peg affixed to and extending from said reciprocating drive shaft extending into said groove in said twine take-up shaft whereby the longitudinal movement of said drive shaft moves said peg in said groove to rotate said twine take-up shaft.

8. A twine holder for hay balers according to claim 7 including a rotatably mounted oscillating drive shaft driven by outside means.

9. A twine holder for hay balers according to claim 7 including a rotatably mounted drive shaft driven by outside means.

10. A twine knotter for hay balers according to claim 7 including a twine take-up shaft mounted parallel to and spaced apart from said reciprocating drive shaft and said bill hook shaft, said twine take-up shaft having a groove on the exterior longitudinal surface thereof;

a peg affixed to and extending from said reciprocating drive shaft, said peg extending into said groove in said twine take-up shaft whereby the longitudinal movement of said drive shaft moves said peg in said groove to rotate said bill hook shaft; and a means coupling said twine holder members to said twine take-up shaft whereby said twine holder members are pivoted by the rotation of said twine take-up shaft.

11. A twine knotter for hay balers according to claim 7 wherein said twine holders each include a first twine holder housing pivotally mounted to one end of said twine holder shaft and a second twine holder housing attached to the opposite end of said twine holder shaft;

a rotatably mounted cylindrical twine holder received in each of said twine holder housings, with four longitudinal slots on each of said twine holders to receive the said twine;

a semi-circular plate rigidly affixed to said twine holder housings with said plate extending upwardly along side said twine holder;

a gear means attached to said twine holder; and a gear means attached to said twine holder shaft that meshes with said twine holder gear for rotation of said twine holder.

12. A twine knotter for hay balers according to claim 7 including a twine finger shaft rotatably mounted parallel to said reciprocating drive shaft, said twine finger shaft having a groove on the exterior longitudinal surface thereof;

a peg affixed to and extending from said reciprocating drive shaft, said peg extending into said groove in said twine finger shaft whereby the longitudinal movement of said drive shaft moves said peg in said groove to rotate said twine finger shaft; and a first and a second twine finger pivotally mounted beneath said bill hooks with said first twine finger affixed to one end of said twine finger shaft and said second twine finger affixed to the opposite end of said twine finger shaft.

References Cited in the file of this patent

UNITED STATES PATENTS

| | | |
|---|---|---|
| 475,821 | Stark | May 31, 1892 |
| 2,793,890 | Smith | May 28, 1957 |
| 2,823,059 | Smith | Feb. 11, 1958 |
| 2,879,095 | Altenweger | Mar. 24, 1959 |